United States Patent
Yeh

(10) Patent No.: US 10,152,426 B2
(45) Date of Patent: Dec. 11, 2018

(54) MAPPING TABLE LOADING METHOD, MEMORY CONTROL CIRCUIT UNIT AND MEMORY STORAGE APPARATUS

(71) Applicant: PHISON ELECTRONICS CORP., Miaoli (TW)

(72) Inventor: Chih-Kang Yeh, Kinmen County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 289 days.

(21) Appl. No.: 15/183,813

(22) Filed: Jun. 16, 2016

(65) Prior Publication Data

US 2017/0315925 A1 Nov. 2, 2017

(30) Foreign Application Priority Data

Apr. 29, 2016 (TW) .............................. 105113420 A

(51) Int. Cl.
*G06F 12/02* (2006.01)
*G06F 12/1009* (2016.01)

(52) U.S. Cl.
CPC ...... *G06F 12/1009* (2013.01); *G06F 12/0246* (2013.01); *G06F 2212/1016* (2013.01); *G06F 2212/1041* (2013.01); *G06F 2212/202* (2013.01); *G06F 2212/466* (2013.01); *G06F 2212/65* (2013.01); *G06F 2212/7201* (2013.01); *G06F 2212/7205* (2013.01)

(58) Field of Classification Search
CPC .......................................... G06F 12/10–12/109
See application file for complete search history.

(56) References Cited

U.S. PATENT DOCUMENTS

| | | | | | |
|---|---|---|---|---|---|
| 5,265,236 | A | * | 11/1993 | Mehring | ............. G06F 12/0882 711/203 |
| 2013/0042052 | A1 | * | 2/2013 | Colgrove | ............... G06F 3/0608 711/103 |
| 2014/0379959 | A1 | * | 12/2014 | Canepa | ................ G06F 12/0246 711/103 |
| 2015/0169465 | A1 | * | 6/2015 | Slepon | ................ G06F 12/1009 711/103 |

* cited by examiner

Primary Examiner — Nicholas J Simonetti
(74) Attorney, Agent, or Firm — JCIPRNET

(57) ABSTRACT

A mapping table loading method, a memory control circuit unit and a memory storage apparatus are provided. The method includes: receiving a first command; loading a first sub-logical address-physical address mapping table corresponding to the first command if an operating mode of a non-volatile rewritable memory module is a first operating mode; and loading a first logical address-physical address mapping table corresponding to the first command if the operating mode of the non-volatile rewritable memory module is a second operating mode, wherein the first logical address-physical address mapping table includes the first sub-logical address-physical address mapping table.

24 Claims, 12 Drawing Sheets

| LBA(0) | 410(2) |
|---|---|
| LBA(1) | 410(1) |
| ⋮ | ⋮ |
| LBA(10) | 410(3) |
| ⋮ | ⋮ |
| LBA(Z) | 410(10) |

FIG. 12A

| LBA(0) | 410(2) | LBA(Z+1) | 410(X) |
|---|---|---|---|
| LBA(1) | 410(1) | LBA(Z+2) | 410(X+1) |
| ⋮ | ⋮ | ⋮ | ⋮ |
| LBA(10) | 410(3) | LBA(Z+11) | 410(X+11) |
| ⋮ | ⋮ | | |
| LBA(Z) | 410(10) | | |

FIG. 12B

MAPPING TABLE LOADING METHOD, MEMORY CONTROL CIRCUIT UNIT AND MEMORY STORAGE APPARATUS

CROSS-REFERENCE TO RELATED APPLICATION

This application claims the priority benefit of Taiwan application serial no. 105113420, filed on Apr. 29, 2016. The entirety of the above-mentioned patent application is hereby incorporated by reference herein and made a part of this specification.

BACKGROUND

Technical Field

The present invention relates to a mapping table loading method, a memory control circuit unit and a memory storage apparatus.

Description of Related Art

The growth of digital cameras, mobile phones, and MP3 players has been rapid in recent years. Consequently, the consumers' demand for storage media has increased tremendously. A rewritable non-volatile memory is one of the most adaptable memories for portable electronic products such as laptop computer due to its data non-volatility, low power consumption, small volume, non-mechanical structure and high read/write speed. A solid state drive (SSD) is a memory storage apparatus which utilizes a flash memory module as a storage medium. For these reasons, the flash memory has become an import part of the electronic industries.

In general, the rewritable non-volatile memory module usually includes a plurality of physical erasing units, and each of the physical erasing units includes a plurality of physical programming units. A memory management circuit in the memory storage apparatus can assign logical addresses for mapping to the physical erasing units. Each of the logical addresses includes a plurality of logical units for mapping to the physical programming units of the corresponding physical erasing unit.

In order to identify which of the physical erasing units is data of each of the logical addresses being stored into, the memory management circuit can record a mapping between the logical addresses and the physical erasing units. Specifically, the memory control circuit unit can store a plurality of logical address-physical address mapping tables in the rewritable non-volatile memory module for recording the physical erasing unit mapped by each of the logical addresses. When intending to access data, the memory management circuit can load the corresponding logical address-physical address mapping table into a buffer memory for maintenance and write or read the data according to the logical address-physical address mapping table.

It should be noted that, the memory management circuit usually manages the logical address-physical address mapping tables in a fixed size. For example, when intending to access data, the memory management circuit loads the logical address-physical address mapping table in the fixed size into the buffer memory, and writes or reads the data according to the logical address-physical address mapping table.

In particular, when a random read operation is performed by the memory management circuit, it is often that only a part of information from the loaded logical address-physical address mapping table is used. When the memory management circuit repeatedly performs the random read operation, the memory management circuit may load the different logical address-physical address mapping tables multiple times but only use a part of information from each of logical address-physical address mapping tables. Accordingly, such condition can lower a usage efficiency of the logical address-physical address mapping table. Further, when the logical address-physical address mapping table is in larger size, repeatedly loading the different logical address-physical address mapping tables also results in waste of bandwidth in the memory storage apparatus and thereby leads to a performance deterioration of the memory storage apparatus.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a mapping table loading method, a memory control circuit unit and a memory storage apparatus, which are capable of effectively improving the usage efficiency and performance of the memory storage apparatus.

An exemplary embodiment of the present invention provides a mapping table loading method for a rewritable non-volatile memory module. The rewritable non-volatile memory module stores a plurality of logical address-physical address mapping tables, and each of the logical address-physical address mapping tables includes a plurality of sub-logical address-physical address mapping tables. The mapping table loading method includes: receiving a first command, wherein the first command corresponds to data stored in a first logical address; loading a first sub-logical address-physical address mapping table among the sub-logical address-physical address mapping tables from the rewritable non-volatile memory module into a buffer memory if an operating mode corresponding to the rewritable non-volatile memory module is a first operating mode, wherein the first sub-logical address-physical address mapping table records mapping information corresponding to the first logical address; and loading a first logical address-physical address mapping table among the logical address-physical address mapping tables from the rewritable non-volatile memory module into the buffer memory if the operating mode corresponding to the rewritable non-volatile memory module is a second operating mode, wherein the first logical address-physical address mapping table records mapping information corresponding to the first logical address, wherein the first logical address-physical address mapping table includes the first sub-logical address-physical address mapping table.

An exemplary embodiment of the present invention provides a memory control circuit unit for controlling a rewritable non-volatile memory module. The memory control circuit unit includes: a host interface configured to couple to a host system; a memory interface configured to couple to the rewritable non-volatile memory module, wherein the rewritable non-volatile memory module stores a plurality of logical address-physical address mapping tables, and each of the logical address-physical address mapping tables includes a plurality of sub-logical address-physical address mapping tables; a buffer memory; and a memory management circuit coupled to the host interface, the memory interface and the buffer memory. The memory management circuit is configured to receive a first command, wherein the first command corresponds to data stored in a first logical address. The memory management circuit is further configured to load a first sub-logical address-physical address mapping table among the sub-logical address-physical address mapping tables from the rewritable non-volatile memory module into a buffer memory if an operating mode corresponding to the rewritable non-volatile memory module is a first operating mode, wherein the first sub-logical address-physical address mapping table records mapping information corresponding to the first logical address. The memory management circuit is further configured to load a first logical address-physical address mapping table among the logical address-physical address mapping tables from the rewritable non-volatile memory module into the buffer memory if the operating mode corresponding to the rewritable non-volatile memory module is a second operating mode, wherein the first logical address-physical address mapping table records mapping information corresponding to the first logical address, wherein the first logical address-physical address mapping table includes the first sub-logical address-physical address mapping table.

An exemplary embodiment of the present invention provides a memory storage apparatus, which includes: a connection interface unit configured to couple to a host system, a rewritable non-volatile memory module and a memory control circuit unit coupled to the connection interface unit and the rewritable non-volatile memory module. The memory control circuit unit includes a buffer memory. The rewritable non-volatile memory module stores a plurality of logical address-physical address mapping tables, and each of the logical address-physical address mapping tables includes a plurality of sub-logical address-physical address mapping tables. The memory control circuit unit is configured to receive a first command, wherein the first command corresponds to data stored in a first logical address. The memory control circuit unit is further configured to loading a first sub-logical address-physical address mapping table among the sub-logical address-physical address mapping tables from the rewritable non-volatile memory module into a buffer memory if an operating mode corresponding to the rewritable non-volatile memory module is a first operating mode, wherein the first sub-logical address-physical address mapping table records mapping information corresponding to the first logical address. The memory control circuit unit is configured to load a first logical address-physical address mapping table among the logical address-physical address mapping tables from the rewritable non-volatile memory module into the buffer memory if the operating mode corresponding to the rewritable non-volatile memory module is a second operating mode, wherein the first logical address-physical address mapping table records mapping information corresponding to the first logical address, wherein the first logical address-physical address mapping table includes the first sub-logical address-physical address mapping table.

Based on the above, by loading the logical address-physical address mapping tables in different sizes according to the present invention, waste of bandwidth in the memory storage apparatus caused by repeatedly loading the logical address-physical address mapping table with larger capacity by the host system while performing the random read operation may be prevented and the usage efficiency and performance of the memory storage apparatus may also be improved accordingly.

To make the above features and advantages of the invention more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 12A and FIG. 12B are schematic diagrams illustrating a memory reading method according to a fourth exemplary embodiment.

DESCRIPTION OF THE EMBODIMENTS

Figure 1:
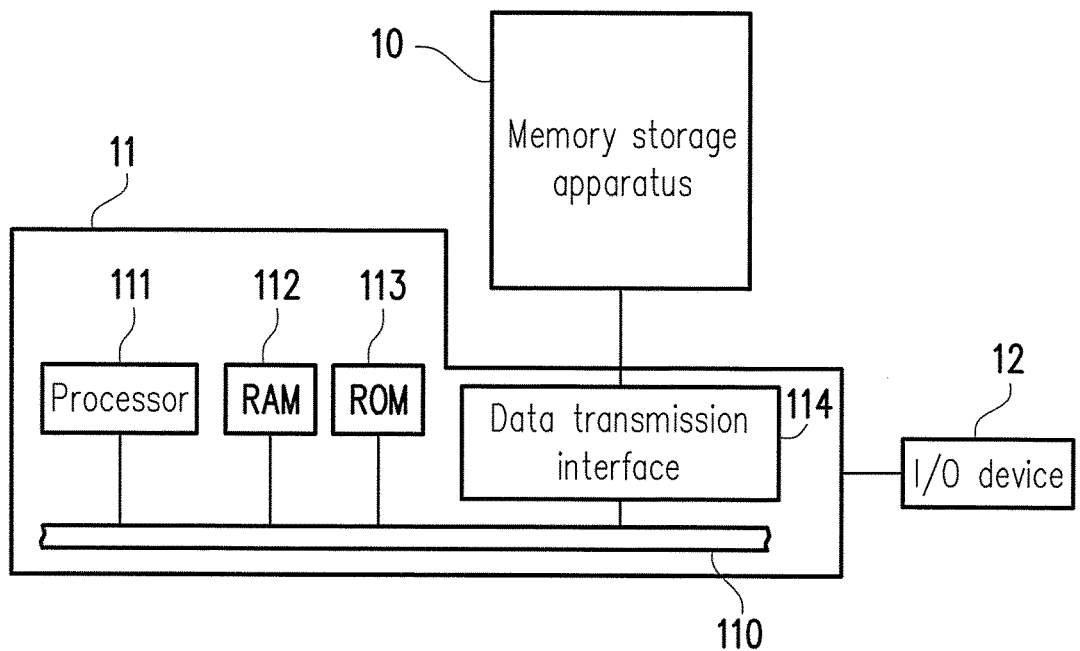
FIG. 1 is a schematic diagram illustrating a host system, a memory storage apparatus and an input/output (I/O) device according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or"

are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage apparatus (also known as a memory storage system) includes a rewritable non-volatile memory module and a controller (also known as a control circuit unit). The memory storage apparatus is usually configured together with a host system so the host system may write data into the memory storage apparatus or read data from the memory storage apparatus.

Figure 2:
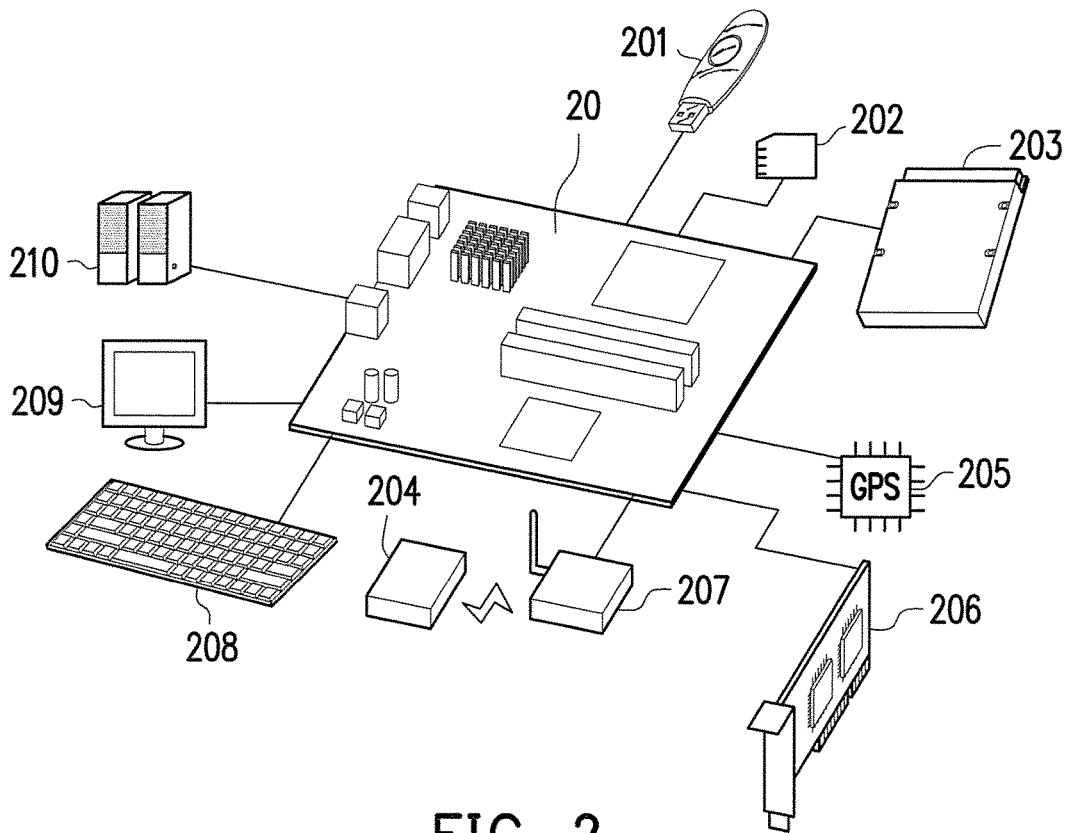
FIG. 2 is a schematic diagram illustrating a host system, a memory storage apparatus and an input/output (I/O) device according to another exemplary embodiment.

FIG. 1 is a schematic diagram illustrating a host system, a memory storage apparatus and an input/output (I/O) device according to an exemplary embodiment, and FIG. 2 is a schematic diagram illustrating a host system, a memory storage apparatus and an input/output (I/O) device according to another exemplary embodiment.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage apparatus 10 through the data transmission interface 114. For example, the host system 11 may write data into the memory storage apparatus 10 or read data from the memory storage apparatus 10 through the data transmission interface 114. Further, the host system 111 is coupled to an I/O device 12 through the system bus 110. For example, the host system 11 can transmit output signals to the I/O device 12 or receive input signals from 1/0 device 12 through the system bus 110.

In the present exemplary embodiment, the processor 111, the RAM 112, the ROM 113 and the data transmission interface 114 are disposed on a main board 20 of the host system 11. The number of the data transmission interface 114 may be one or more. Through the data transmission interface 114, the main board 20 may be coupled to the memory storage apparatus 10 in a wired manner or a wireless manner. The memory storage apparatus 10 may be, for example, a flash drive 201, a memory card 202, a SSD (Solid State Drive) 203 or a wireless memory storage apparatus 204. The wireless memory storage apparatus 204 may be, for example, a memory storage apparatus based on various wireless communication technologies, such as a NFC (Near Field Communication Storage) memory storage apparatus, a WiFi (Wireless Fidelity) memory storage apparatus, a Bluetooth memory storage apparatus, a BLE (Bluetooth low energy) memory storage apparatus (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 may access the wireless memory storage apparatus 204 through the wireless transmission device 207.

Figure 3:
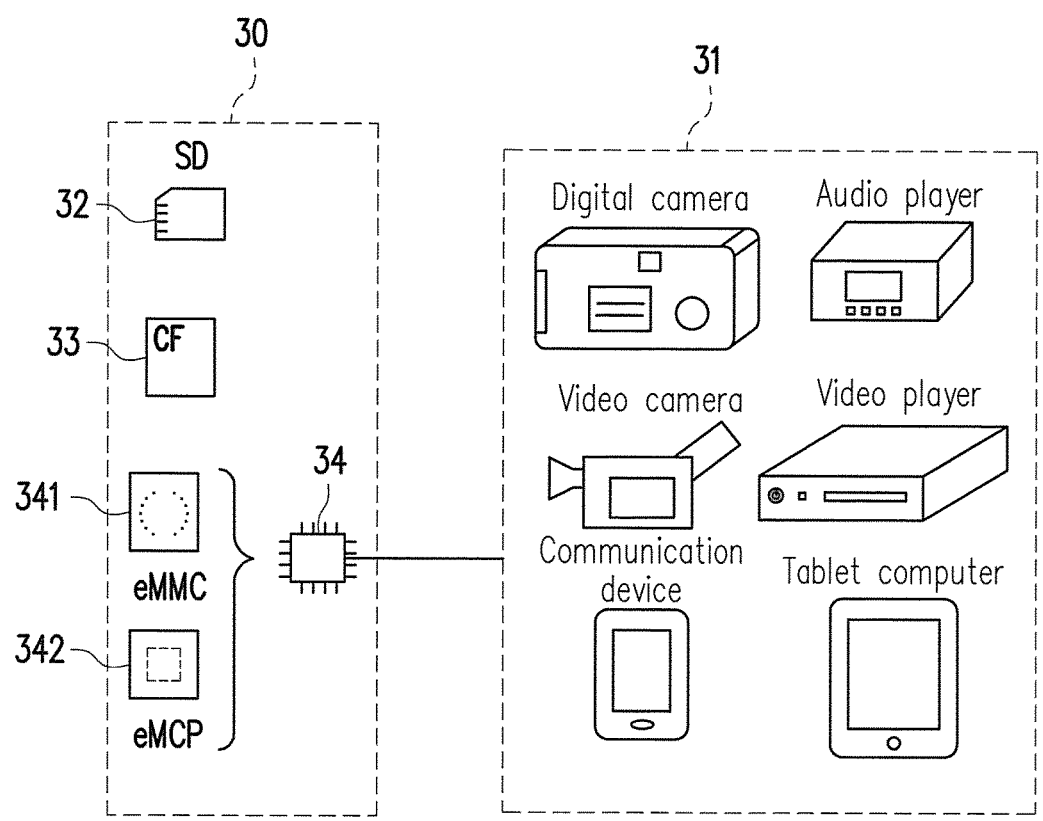
FIG. 3 is a schematic diagram illustrating a host system and a memory storage apparatus according to an exemplary embodiment of the invention.

In an exemplary embodiment, aforementioned host system may be any system capable of substantially cooperating with the memory storage apparatus for storing data. Although the host system is illustrated as a computer system in foregoing exemplary embodiment, however, FIG. 3 is a schematic diagram illustrating a host system and a memory storage apparatus according to another exemplary embodiment. Referring to FIG. 3, in another exemplary embodiment, a host system 31 may also be a system including a digital camera, a video camera, a communication device, an audio player, a video player or a tablet computer, whereas a memory storage apparatus 30 may be various non-volatile memory devices used by the host system, such as a SD card 32, a CF card 33 or an embedded storage device 34. The embedded storage device 34 includes various embedded storage devices capable of directly coupling a memory module onto a substrate of the host system, such as an eMMC (embedded MMC) 341 and/or an eMCP (embedded Multi Chip Package) 342.

Figure 4:
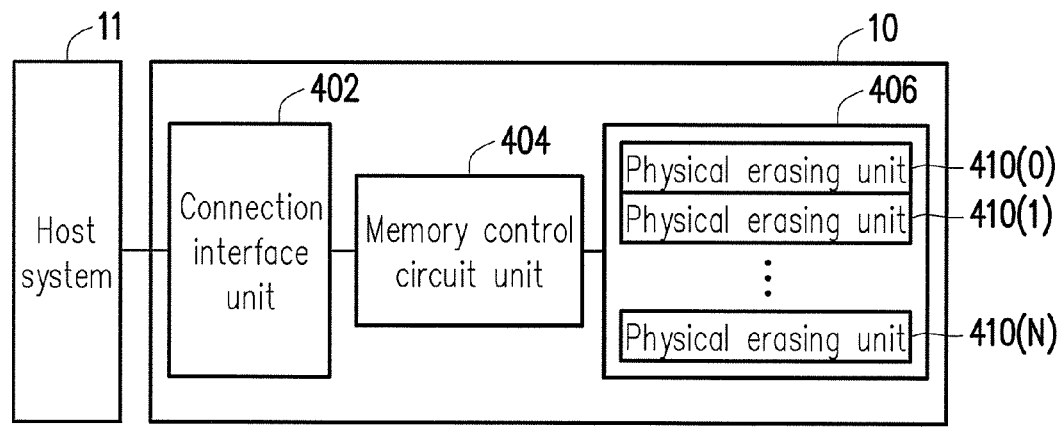
FIG. 4 is a schematic block diagram illustrating a host system and a memory storage apparatus according to an exemplary embodiment.

FIG. 4 is a schematic block diagram illustrating a host system and a memory storage apparatus according to an exemplary embodiment.

Referring to FIG. 4, the memory storage apparatus 10 includes a connection interface unit 402, a memory control circuit unit 404 and a rewritable non-volatile memory module 406.

In the present exemplary embodiment, the connection interface unit 402 is compatible with a SATA (Serial Advanced Technology Attachment) standard. Nevertheless, it should be understood that the present invention is not limited thereto. The connection interface unit 402 may also be compatible to a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a UHS-I (Ultra High Speed-I) interface standard, a UHS-II (Ultra High Speed-II) interface standard, a SD (Secure Digital) interface standard, a MS (Memory Stick) interface standard, a Multi-Chip Package interface standard, a MMC (Multi Media Card) interface standard, an eMMC (Embedded Multimedia Card) interface standard, a UFS (Universal Flash Storage) interface standard, an eMCP (embedded Multi Chip Package) interface standard, a CF (Compact Flash) interface standard, an IDE (Integrated Device Electronics) interface standard or other suitable standards. In the present exemplary embodiment, the connection interface unit 402 and the memory control circuit unit 404 may be packaged into one chip, or the connection interface unit 402 is distributed outside of a chip containing the memory control circuit unit.

The memory control circuit unit 404 is configured to execute a plurality of logic gates or control instructions which are implemented in a hardware form or in a firmware form and perform operations of writing, reading or erasing data in the rewritable non-volatile memory storage module 406 according to the commands of the host system 11.

The rewritable non-volatile memory module 406 is coupled to the memory control circuit unit 404 and configured to store data written from the host system 11. The rewritable non-volatile memory storage module 406 includes multiple physical erasing units 410(0) to 410(N). For example, the physical erasing units 410(0) to 410(N) may belong to the same memory die or belong to different memory dies. Each physical erasing unit has a plurality of physical programming units, and the physical programming units of the same physical erasing unit may be written separately and erased simultaneously. Nevertheless, it should be understood that the invention is not limited thereto. Each physical erasing unit may be constituted by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also contain more or less physical access addresses, and the number and size of the physical access addresses are not limited by the invention. For example, in one exemplary embodiment, the physical erasing unit is a physical block, and the physical programming unit is a physical page or a physical sector, but the invention is not limited thereto.

In the present exemplary embodiment, the rewritable non-volatile memory module 406 is a Trinary Level Cell (TLC) NAND-type flash memory module (i.e., a flash memory module capable of storing three data bits in one memory cell). However, the disclosure is not limited thereto. The rewritable non-volatile memory module 406 may also be a Multi Level Cell (MLC) NAND-type flash memory module (i.e., a flash memory module capable of storing two data bits in one memory cell) or other memory module having the same features.

Figure 5:
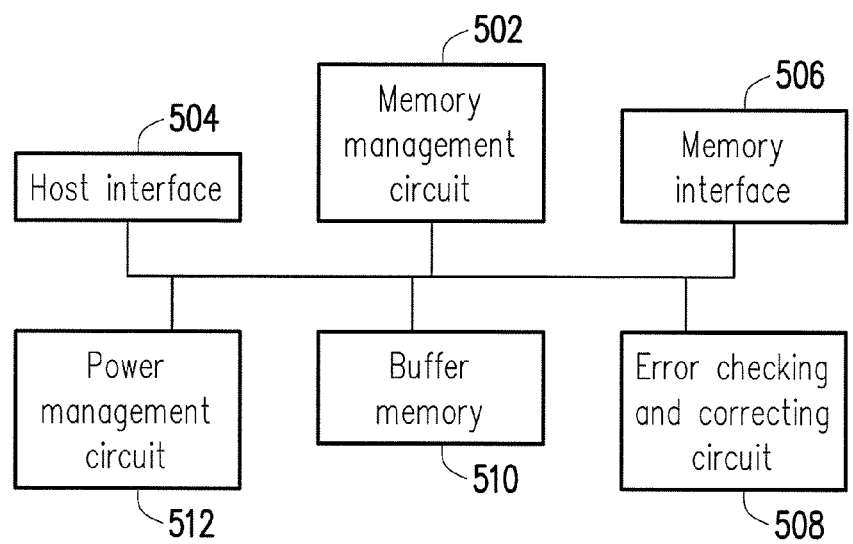
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, a memory interface 506, a buffer memory 508, a power management circuit 510, and an error or checking and correcting circuit 512.

The memory management circuit 502 is configured to control overall operations of the memory control circuit unit 404. Specifically, the memory management circuit 502 has a plurality of control instructions and the control instructions are executed to perform various operations such as writing, reading and erasing data when the memory storage apparatus 10 operates.

In the present exemplary embodiment, the control instructions of the memory management circuit 502 are implemented in form of firmware. For instance, the memory management circuit 502 has a microprocessor unit (not illustrated) and a read-only memory (not illustrated), and the control instructions are burnt into the read-only memory. When the memory storage apparatus 10 operates, the control instructions are executed by the microprocessor to perform operations of writing, reading or erasing data.

Figure 6:
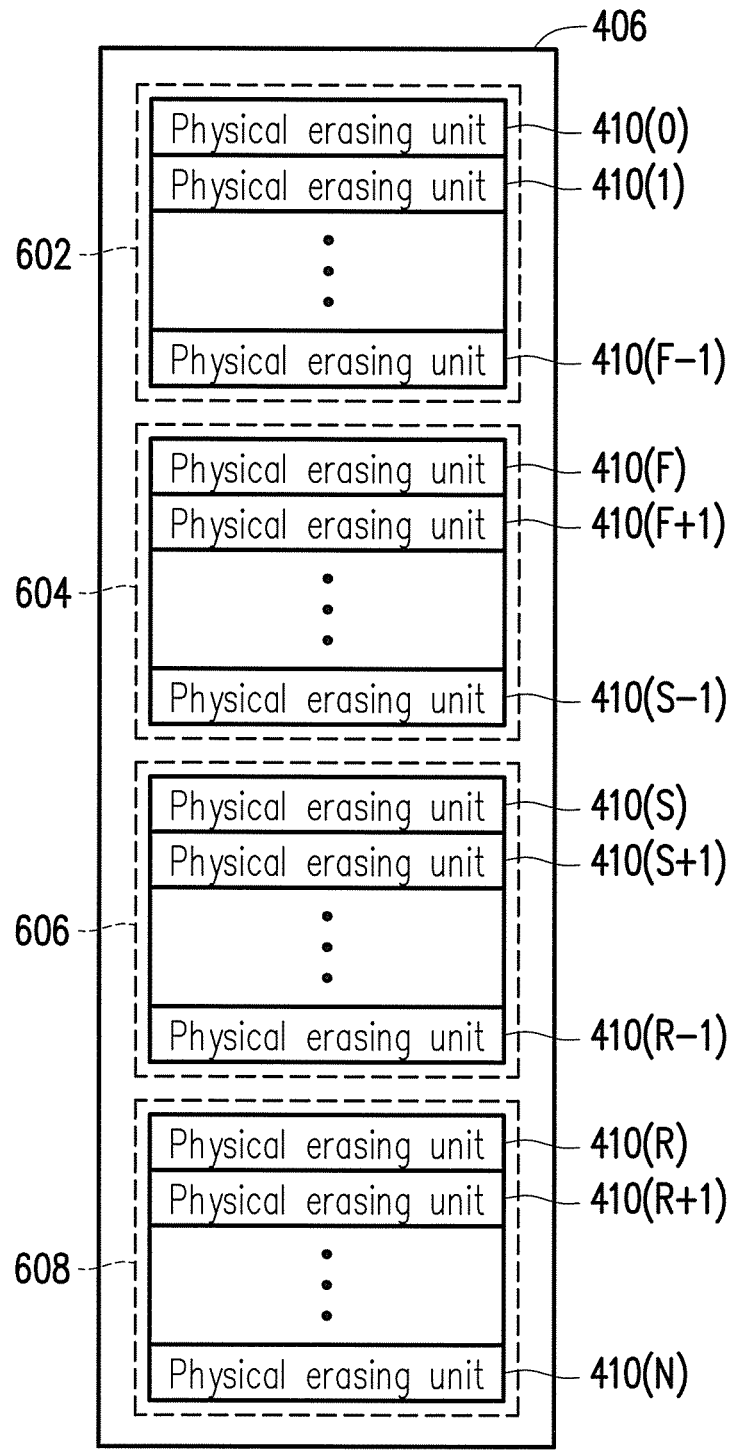
FIG. 6 and FIG. 7 are schematic diagrams illustrating a management of the physical erasing units according to an exemplary embodiment.
Figure 7:
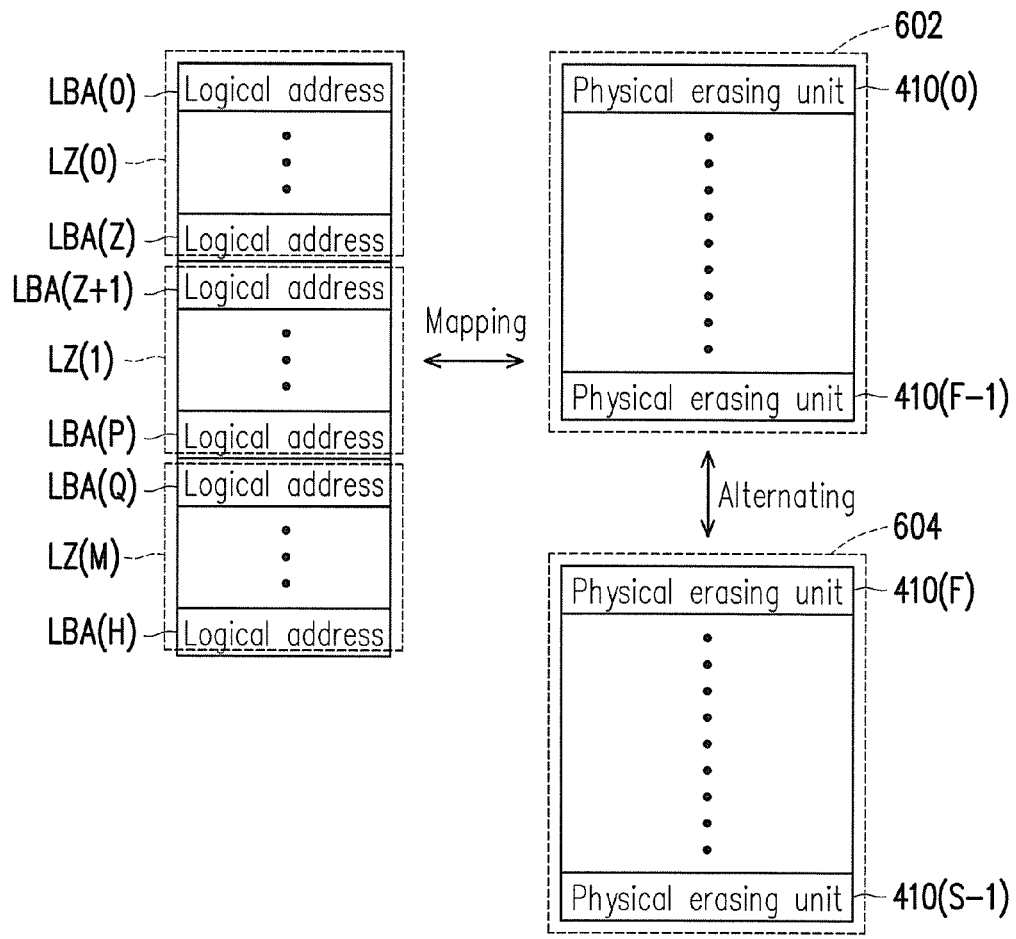

FIG. 6 and FIG. 7 are schematic diagrams illustrating a management of the physical erasing units according to an exemplary embodiment.

It should be understood that terms, such as "get", "retrieve", "group", "divide", "associate" and so forth, are logical concepts which describe operations in the physical erasing units of the rewritable non-volatile memory module 406. That is, the physical erasing units of the rewritable non-volatile memory module are logically operated, but actual positions of the physical units of the rewritable non-volatile memory module are not changed.

Referring to FIG. 6, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management unit 502 uses the physical erasing units retrieved from the spare area 604 for writing data as a replacement to the physical erasing units in the data area 602.

The physical erasing units logically belonging to the system area 606 are configured to record system data. For example, the system data includes information related to manufacturer and model of the rewritable non-volatile memory module, a number of physical erasing units in the rewritable non-volatile memory module, a number of the physical programming units in each physical erasing unit, and so forth.

The physical erasing units logically belonging to the replacement area 608 are used in a bad physical erasing unit replacement procedure for replacing damaged physical erasing units. More specifically, if the replacement area 608 still includes normal physical erasing units when the physical erasing units of the data area 602 are damaged, the memory management circuit 502 retrieves the normal physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operation of the memory storage apparatus 10, grouping relations of the physical erasing units for associating with the data area 602, the spare area 604, the system area 606, and the replacement area 608 may be dynamically changed. For example, when the damaged physical erasing units in the spare area 604 are replaced by the physical erasing units in the replacement area 608, the physical erasing units originally from the replacement area 608 are then associated with the spare area 604.

Referring to FIG. 7, the memory control circuit unit 404 (or the memory management circuit 502) assigns logical addresses LBA(0) to LBA(H) for mapping to the physical erasing units of the data area 602, wherein each of the logical addresses includes a plurality of logical units for mapping to the corresponding physical programming units of the physical erasing units. When the host system 11 intends to write the data into the logical addresses or update the data stored in the logical addresses, the memory control circuit unit 404 (or the memory management unit 502) retrieves one physical erasing unit from the spare area 604 as an active physical erasing unit to alternate the physical erasing units of the data area 602 for writing data. Further, when the active physical erasing unit serving as the active physical erasing unit is fully written, the memory control circuit unit 404 (or the memory management circuit 502) again retrieves an empty physical erasing unit from the spare area 504 as the active physical erasing unit to continue writing the data corresponding to the write command from the host system 11. Further, when the number of the available physical erasing units in the spare area 604 is less than a preset value, the memory control circuit unit 404 (or the memory management circuit 502) performs a valid data merging procedure (also known as a garbage collection procedure) to merge the valid data in the data area 602, so as to re-associate the physical erasing units not storing with the valid data in the data area 602 to the spare area 604.

In order to identify data in each of the logical addresses is stored in which of the physical erasing units, the memory control circuit unit 404 (or the memory management circuit 502) may record the mappings between the logical addresses and the physical erasing units. For example, in the present exemplary embodiment, the memory control circuit unit (or the memory management circuit 502) stores a logical address-physical address mapping table in the rewritable non-volatile memory module 406 for recording the physical erasing unit mapped by each of the logical addresses. When intending to access data, the memory control circuit unit 404 (or the memory management circuit 502) loads the logical address-physical address mapping table into the buffer memory 508 for maintenance and writes or reads data according to the logical address-physical address mapping table.

It is worth mentioning that, the buffer memory 508 is unable to store the mapping table recording the mapping relations of all the logical addresses due to limited capacity. Therefore, in the present exemplary embodiment, the memory control circuit unit 404 (or the memory management circuit 502) groups the logical addresses LBA(0) to LBA(H) into a plurality of logical zones LZ(0) to LZ(M), and assigns one logical address-physical address mapping table for each of the logical zones. In particular, when the memory control circuit unit 404 (or the memory management circuit 502) intends to update the mapping for one specific logical address, the logical address-physical address mapping table of the logical zone to which the logical address belongs is correspondingly loaded into the buffer memory 508 for updating.

In another exemplary embodiment, the control instructions of the memory management circuit 502 may also be stored, in form of program codes, into a specific area (e.g., a system area in the memory module exclusively used for storing the system data) of the rewritable non-volatile memory module 406. In addition, the memory management circuit 502 has a microprocessor unit (not illustrated), a ROM (not illustrated) and a RAM (not illustrated). Particularly, the ROM has an activate code, which is executed by the microprocessor unit to load the control instructions stored in the rewritable non-volatile memory module 406 to the RAM of the memory management circuit 502 when the memory control circuit unit 404 is enabled. Later, the control instructions are executed by the microprocessor unit to perform operations of writing, reading or erasing data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to issue a write command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erase command to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406.

Referring back to FIG. 5, the host interface 504 is coupled to the memory management circuit 502 and configured to couple to the connection interface unit 402, so as to receive and identify commands and data sent from the host system 11. In other words, the commands and data transmitted by the host system 11 are transmitted to the memory management circuit 502 through the host interface 504. In the present exemplary embodiment, the host interface 504 is compatible with the SATA standard. However, it should be understood that the present invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. In other words, data to be written to the rewritable non-volatile memory module 406 is converted into a format acceptable by the rewritable non-volatile memory module 406 through the memory interface 506.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control power of the memory storage apparatus 10.

The error checking and correcting circuit 512 is coupled to the memory management circuit 502 and configured to perform an error checking and correcting procedure to ensure the correctness of data. For example, when a write command is received by the memory management circuit 502 from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when reading the data from the rewritable non-volatile memory module 406, the memory management circuit 502 also read the error checking and correcting code corresponding to the data at the same timer so the error or checking and correcting circuit 512 may execute the error checking and correcting procedure for the read data according to the error or checking and correcting code.

It is worth mentioning that, in the present exemplary embodiment, the memory control circuit unit 404 (or the memory management circuit 502) groups the logical addresses LBA(0) to LBA(H) into a plurality of logical zones LZ(0) to LZ(M), and assigns one logical address-physical address mapping table for each of the logical zones. Particularly, the memory control circuit unit 404 (or the memory management circuit 502) also divides one logical address-physical address mapping table into a plurality of sub-logical address-physical address mapping tables.

Figure 8A:
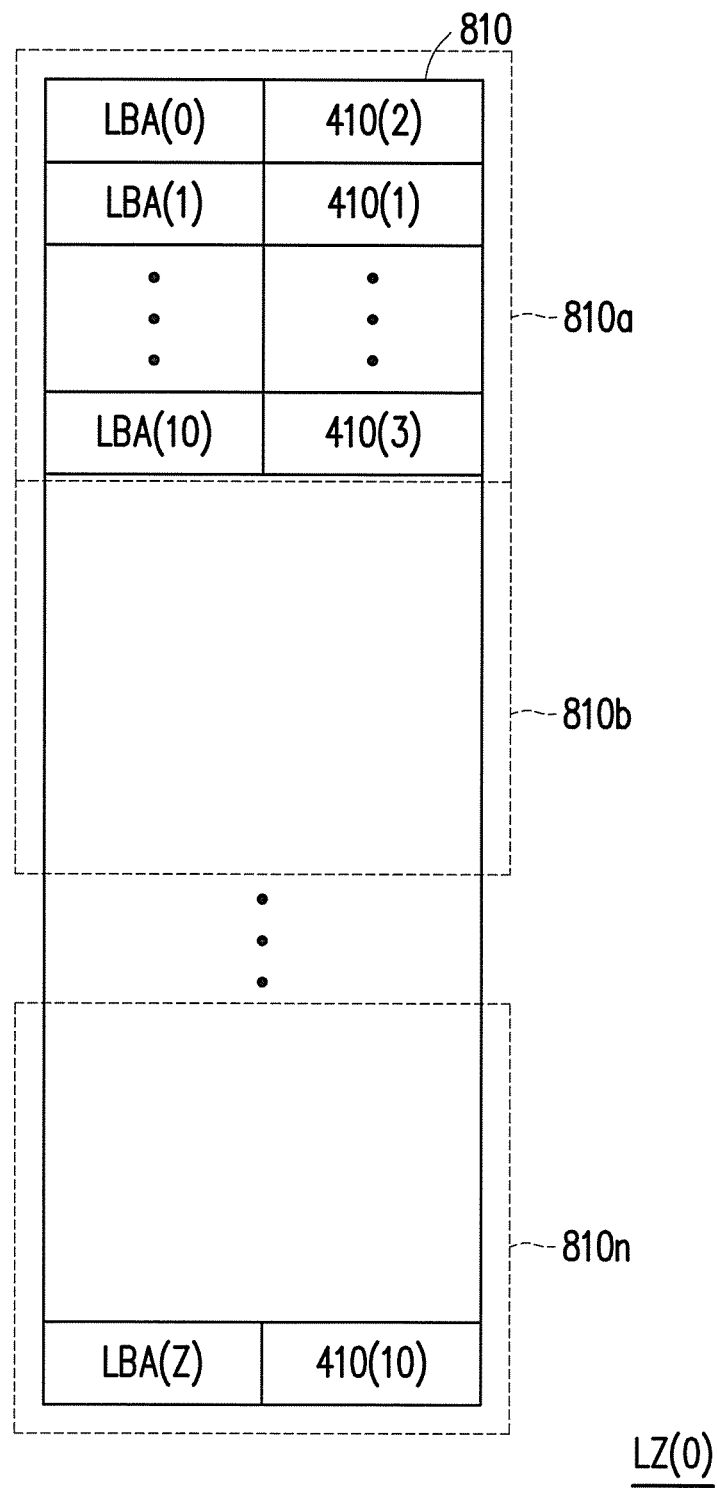
FIG. 8A and FIG. 8B are schematic diagrams illustrating examples of the logical address-physical address mapping tables and a plurality of sub-logical address-physical address mapping tables corresponding thereto according to an exemplary embodiment.
Figure 8B:
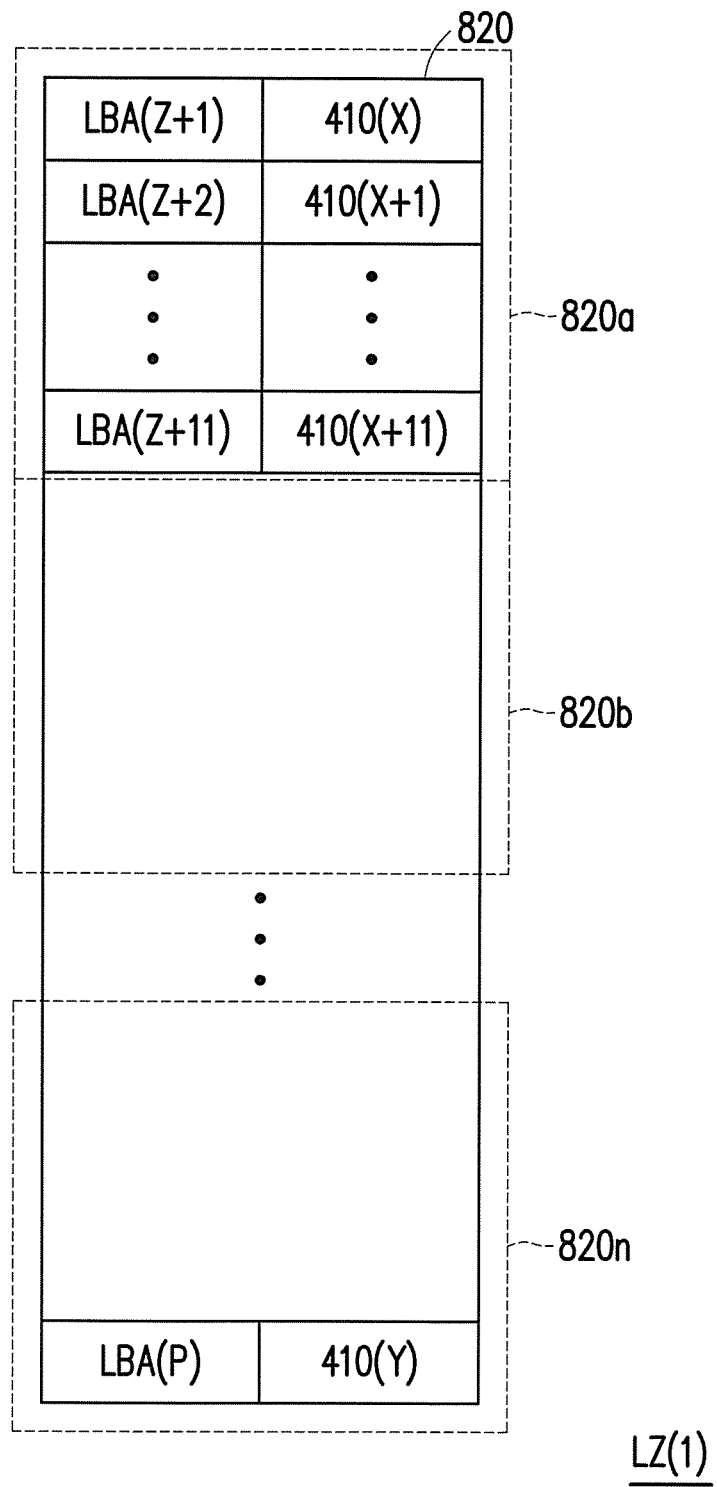

FIG. 8A and FIG. 8B are schematic diagrams illustrating examples of the logical address-physical address mapping tables and a plurality of sub-logical address-physical address mapping tables corresponding thereto according to an exemplary embodiment.

Referring to FIG. 8A, taking a logical address-physical address mapping table 810 corresponding to the logical zone LZ(0) for example, the logical address-physical address mapping table 810 stores with mapping information between the logical addresses LBA(0) to LBA(Z) and a plurality of physical addresses. The memory control circuit unit 404 (or the memory management circuit 502) also divides the logical address-physical address mapping table 810 into a plurality of sub-logical address-physical address mapping tables 810a to 810n.

Further, referring to FIG. 8B, taking a logical address-physical address mapping table 820 corresponding to the logical zone LZ(1) for example, the logical address-physical address mapping table 820 stores with mapping information between the logical addresses LBA(Z+1) to LBA(P) and a plurality of physical addresses. The memory control circuit unit 404 (or the memory management circuit 502) also divides the logical address-physical address mapping table 810 into a plurality of sub-logical address-physical address mapping tables 820a to 820n. In the exemplary embodiment of FIG. 8A and FIG. 8B, each of the sub-logical address-physical address mapping tables has eleven entries of the mapping information between the logical address and the physical address. However, it should be noted that, the present invention is not intended to limit the number of the mapping information that each of the sub-logical address-physical address mapping tables can store. Further, in other exemplary embodiments, the size of one sub-logical address-physical address mapping table in the same logical address-physical address mapping table may be different from the size of another sub-logical address-physical address mapping table in the same logical address-physical address mapping table. In other words, the size of one sub-logical address-physical address mapping table is less than the size of one logical address-physical address mapping table, and yet the sizes of the sub-logical address-physical address mapping tables may be different.

In addition, when the memory control circuit unit 404 (or the memory management circuit 502) requires the mapping information of one specific logical address, according to a current operating mode of the rewritable non-volatile memory module 406, the memory control circuit unit 404 (or the memory management circuit 502) can selectively load the corresponding sub-logical address-physical address mapping table to which the logical address belongs into the buffer memory 508 or load the logical address-physical address mapping table corresponding to the logical zone to which the logical address belongs into the buffer memory 508 for reading. For example, if the current operating mode of the rewritable non-volatile memory module 406 is a first operating mode, the memory control circuit unit 404 (or the memory management circuit 502) loads the corresponding sub-logical address-physical address mapping table to which the logical address belongs into the buffer memory 508. If the current operating mode of the rewritable non-volatile memory module 406 is a second operating mode, the memory control circuit unit 404 (or the memory manage-ment circuit 502) loads the logical address-physical address mapping table corresponding to the logical zone to which the logical address belongs into the buffer memory 508. It should be noted that, in an exemplary embodiment of the invention, the operating mode of the rewritable non-volatile memory module 406 is preset as the first operating mode each time after power-on.

First Exemplary Embodiment

Figure 9A:
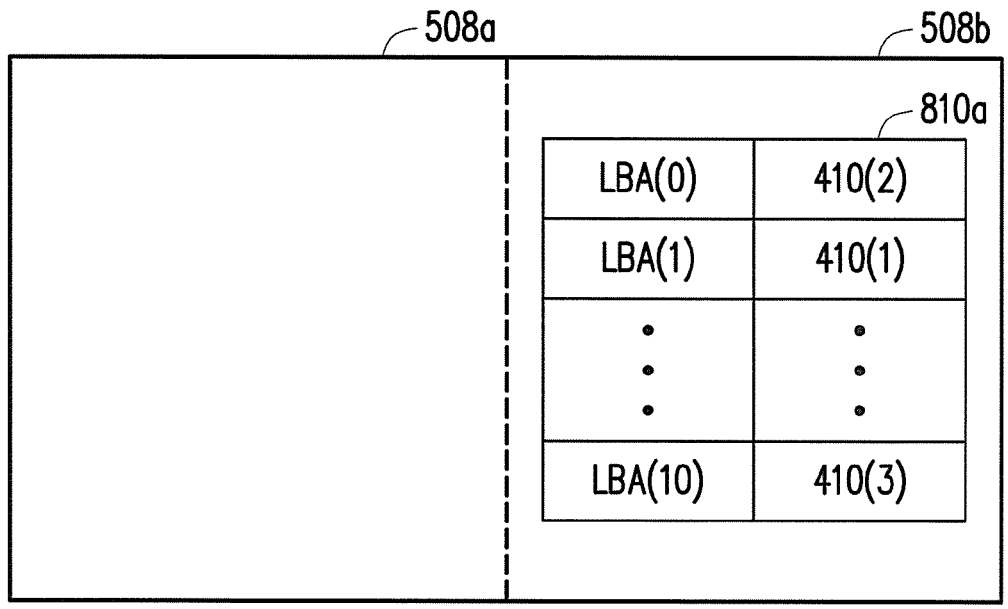
FIG. 9A and FIG. 9B are schematic diagrams illustrating a memory reading method according to a first exemplary embodiment.
Figure 9B:
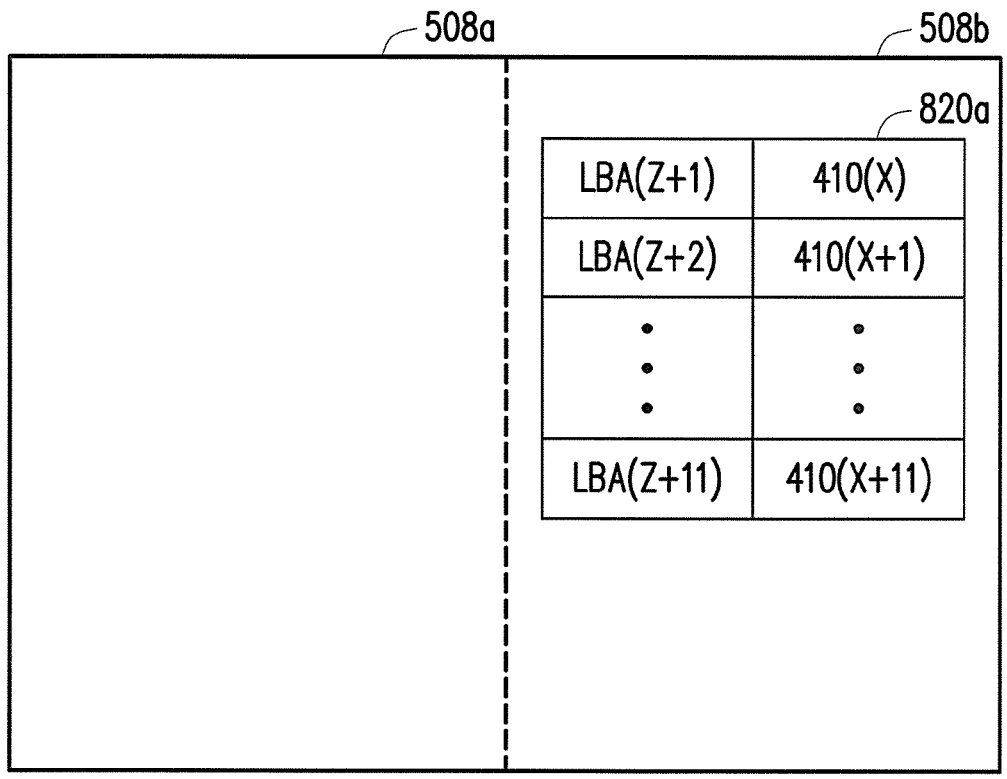

FIG. 9A and FIG. 9B are schematic diagrams illustrating a memory reading method according to a first exemplary embodiment. It should be stated that, in an exemplary embodiment, the memory control circuit unit 404 (or the memory management circuit 502) will establish a management table (not illustrated) in the buffer memory 508. The management table is configured to record the number of times one specific sub-logical address-physical address mapping table being loaded into the buffer memory 508 and used by the memory control circuit unit 404 (or the memory management circuit 502) (hereinafter, also known as a use count). In brief, the management table is configured to record a usage history of one specific sub-logical address-physical address mapping table.

Referring to FIG. 9A, in the exemplary embodiment of FIG. 9A, the memory control circuit unit 404 (or the memory management circuit 502) divides the buffer memory 508 into a first mapping table temporary storage area 508a and a second mapping table temporary storage area 508b. The first mapping table temporary storage area 508a is configured to temporarily store the logical address-physical address mapping table loaded from the rewritable non-volatile memory module 406, and the second mapping table temporary storage area 508b is configured to temporarily store the sub-logical address-physical address mapping table loaded from the rewritable non-volatile memory module 406.

It is assumed herein that the host system 11 issues a read command (hereinafter, referred to as a second command) to instruct reading data stored in the logical address LBA(0). After the memory control circuit unit 404 (or the memory management circuit 502) receives the second command from the host system 11, the memory control circuit unit 404 (or the memory management circuit 502) may determine whether the current operating mode of the rewritable non-volatile memory module 406 is the first operating mode or the second operating mode. For example, the memory control circuit unit 404 (or the memory management circuit 502) may determine the current operating mode of the rewritable non-volatile memory module 406 as the first operating mode or the second operating mode by determining whether the sub-logical address-physical address mapping table having the mapping information of the logical address LBA(0) is used before according to the management table.

Since the rewritable non-volatile memory module 406 just entered a state of power-on and the management table does not include the usage history of the sub-logical address-physical address mapping table related to the logical address LBA(0) at the time, the memory control circuit unit 404 (or the memory management circuit 502) may determine the current operating mode of the rewritable non-volatile memory module 406 as the first operating mode. Accordingly, the memory control circuit unit 404 (or the memory management circuit 502) may load the sub-logical address-physical address mapping table 810a (hereinafter, referred to as a second sub-logical address-physical address mapping table) corresponding to the second command from the rewritable non-volatile memory module 406 into the second mapping table temporary storage area 508b of the buffer memory 508. The sub-logical address-physical address mapping table 810a records the mapping information corresponding to the logical address LBA(0). Particularly, in this example, the sub-logical address-physical address mapping table 810a only includes, for example, the mapping information of the logical addresses LBA(0) to LBA(10). However, in another exemplary embodiment, the size of the sub-logical address-physical address mapping table 810a may also be 512 Bytes or other sizes, and the invention is not intended to limit the size of the sub-logical address-physical address mapping table 810a.

Then, the memory control circuit unit 404 (or the memory management circuit 502) may execute the second command according to the sub-logical address-physical address mapping table 810a. Specifically, the memory control circuit unit 404 (or the memory management circuit 502) may use the sub-logical address-physical address mapping table 810a being loaded into the buffer memory 508 to read the data from the physical programming units mapped to the logical address LBA(0). As shown in FIG. 9A, since the second command is configured to read the data in the logical address LBA(0), the memory control circuit unit 404 (or the memory management circuit 502) may determine that the logical address LBA(0) is mapped to the physical erasing unit 410(2) according to the sub-logical address-physical address mapping table 810a. Then, the memory control circuit unit 404 (or the memory management circuit 502) may read the data in the corresponding physical programming units in the physical erasing unit 410(2) according to the second command. It should be noted that, although the second command is described as the read command for example, the present invention is not intended to limit a command type of the second command.

Further, in an exemplary embodiment, the sub-logical address-physical address mapping table 810a temporarily stored in the second mapping table temporary storage area 508b of the buffer memory 508 may only be used once. In other words, after the memory control circuit unit 404 (or the memory management circuit 502) loads the sub-logical address-physical address mapping table 810a and reads the data corresponding to the second command according to the sub-logical address-physical address mapping table 810a, the memory control circuit unit 404 (or the memory management circuit 502) will erase the sub-logical address-physical address mapping table 810a temporarily stored in the buffer memory 508.

Particularly, after the memory control circuit unit 404 (or the memory management circuit 502) executes the second command according to the sub-logical address-physical address mapping table 810a, the memory control circuit unit 404 (or the memory management circuit 502) further updates the usage history corresponding to the sub-logical address-physical address mapping table 810a in the management table. For example, the memory control circuit unit 404 (or the memory management circuit 502) may add one field in the management table for recording the sub-logical address-physical address mapping table 810a including logical addresses LBA(0) to LBA(10), and record the use count of the sub-logical address-physical address mapping table 810a as one.

It is assumed herein that FIG. 9B is in continuation to FIG. 9A. Subsequently, referring to FIG. 9B, it is assumed that the host system 11 then issues a first command, and the first command corresponds data stored in the logical address LBA(Z+1) (hereinafter, referred to as a first logical address). That is to say, the first command is a read command which instructs reading the data stored in the logical address LBA(Z+1). After the memory control circuit unit 404 (or the memory management circuit 502) receives the first command from the host system 11, the memory control circuit unit 404 (or the memory management circuit 502) may determine the current operating mode of the rewritable non-volatile memory module 406 as the first operating mode or the second operating mode. The memory control circuit unit 404 (or the memory management circuit 502) may determine the current operating mode of the rewritable non-volatile memory module 406 as the first operating mode or the second operating mode by determining whether the sub-logical address-physical address mapping table 820a (hereinafter, referred to as a first sub-logical address-physical address mapping table) having the mapping information of the logical address LBA(Z+1) is used before according to the management table.

Since the management table currently only stores with the usage history of the sub-logical address-physical address mapping table 810a and the sub-logical address-physical address mapping table 810a is different from the sub-logical address-physical address mapping table 820a corresponding to the logical address LBA(Z+1), the memory control circuit unit 404 (or the memory management circuit 502) may determine the current operating mode of the rewritable non-volatile memory module 406 as the first operating mode. When the operating mode corresponding to the rewritable non-volatile memory module 406 is the first operating mode, the memory control circuit unit 404 (or the memory management circuit 502) may load the sub-logical address-physical address mapping table 820a corresponding to the first command from the rewritable non-volatile memory module 406 into the second mapping table temporary storage area 508b of the buffer memory 508. The sub-logical address-physical address mapping table 820a records the mapping information corresponding to the logical address LBA(Z+1). In this example, the sub-logical address-physical address mapping table 820a only includes, for example, the mapping information of the logical addresses LBA(Z+1) to LBA(Z+11). However, in another exemplary embodiment, the size of the sub-logical address-physical address mapping table 810a may also be 512 Bytes or other sizes, and the present invention is not intended to limit the size of the sub-logical address-physical address mapping table 810a.

Then, the memory control circuit unit 404 (or the memory management circuit 502) may use the sub-logical address-physical address mapping table 820a being loaded into the buffer memory 508 to read the data from the physical programming units mapped to the logical address LBA(Z+1). Specifically, as shown in FIG. 9B, since the second command is configured to read the data in the logical address LBA(Z+1), the memory control circuit unit 404 (or the memory management circuit 502) may determine that the logical address LBA(Z+1) is mapped to the physical erasing unit 410(X) according to the sub-logical address-physical address mapping table 820a. Then, the memory control circuit unit 404 (or the memory management circuit 502) may read the data in the corresponding physical programming units in the physical erasing unit 410(X) according to the first command.

After the memory control circuit unit 404 (or the memory management circuit 502) loads the sub-logical address-physical address mapping table 820a and reads the data corresponding to the first command according to the sub-logical address-physical address mapping table 820a, the memory control circuit unit 404 (or the memory management circuit 502) will erase the sub-logical address-physical address mapping table 820a temporarily stored in the buffer memory 508.

Further, after the memory control circuit unit 404 (or the memory management circuit 502) executes the first command according to the sub-logical address-physical address mapping table 820a, the memory control circuit unit 404 (or the memory management circuit 502) further updates the use count corresponding to the sub-logical address-physical address mapping table 820a in the management table. For example, the memory control circuit unit 404 (or the memory management circuit 502) may add one field in the management table for recording the sub-logical address-physical address mapping table 820a including logical addresses LBA(Z+1) to LBA(Z+11), and record the use count of the sub-logical address-physical address mapping table 820a as one.

Based on the above, in the first exemplary embodiment, before loading the sub-logical address-physical address mapping table 820a, the memory control circuit unit 404 (or the memory management circuit 502) may determine that the sub-logical address-physical address mapping table 820a including the mapping information of the logical address LBA(Z+1) is not used before by the memory control circuit unit 404 (or the memory management circuit 502). Accordingly, the memory control circuit unit 404 (or the memory management circuit 502) may reasonably determine that the mapping information in the logical address-physical address mapping table 820 corresponding to the sub-logical address-physical address mapping table 820a may less often be used. Therefore, the first operating mode may be used to load the sub-logical address-physical address mapping table 820a with smaller capacity, so as to avoid waste of the bandwidth in the memory storage apparatus caused by repeatedly loading the logical address-physical address mapping table that is relatively larger while the host system 11 is performing the random read operation.

Second Exemplary Embodiment

Figure 10A:
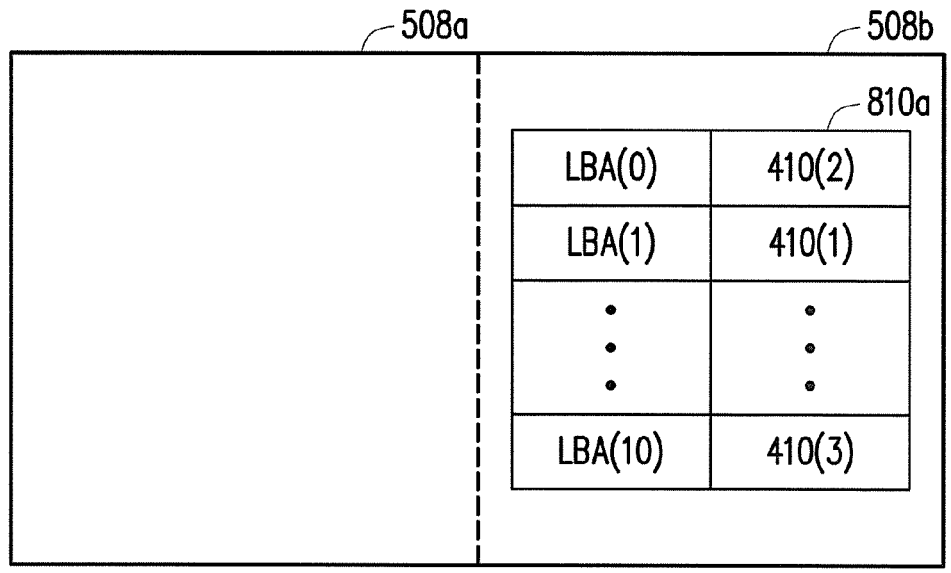
FIG. 10A and FIG. 10B are schematic diagrams illustrating a memory reading method according to a second exemplary embodiment.
Figure 10B:
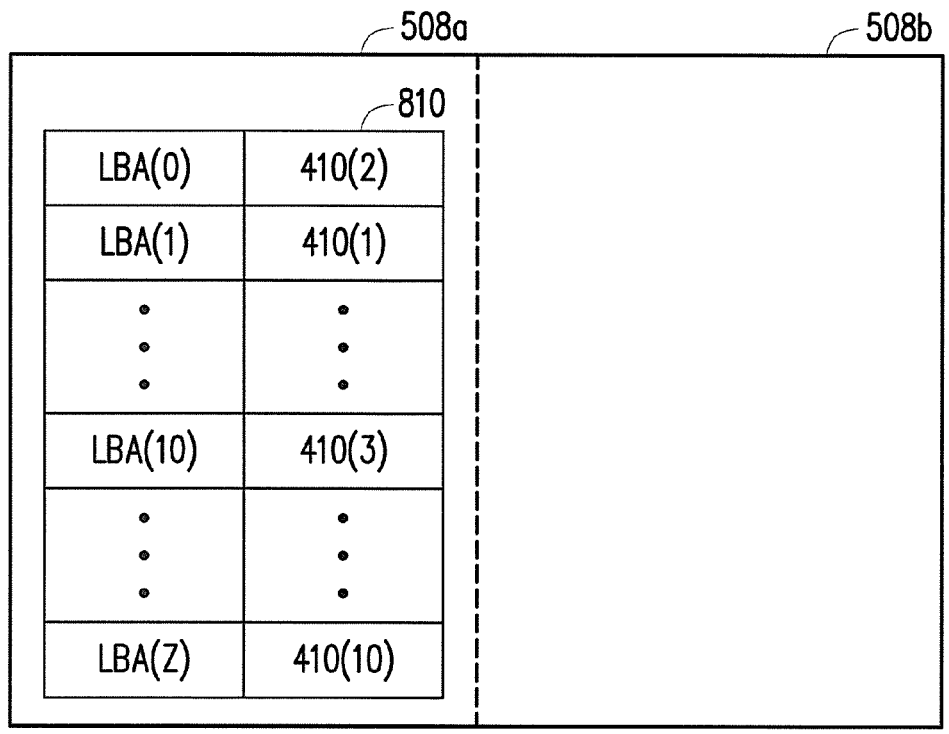

FIG. 10A and FIG. 10B are schematic diagrams illustrating a memory reading method according to a second exemplary embodiment. The exemplary embodiment of FIG. 10A includes similar process of loading the sub-logical address-physical address mapping table 810a according to the second command and recording the usage history of the sub-logical address-physical address mapping table 810a in the management table by the rewritable non-volatile memory module 406 after power-on in FIG. 9A, which is not repeated hereinafter. Referring to FIG. 10B in continuation to FIG. 10A, it is assumed that the host system 11 then issues the first command that corresponds to data stored in the logical address LBA(1) (hereinafter, also referred to as the first logical address), and the first command is a read command which instructs reading the data stored in the logical address LBA(1). After the memory control circuit unit 404 (or the memory management circuit 502) receives the first command from the host system 11, the memory control circuit unit 404 (or the memory management circuit 502) may determine the current operating mode of the rewritable non-volatile memory module 406 as the first operating mode or the second operating mode. The memory control circuit unit 404 (or the memory management circuit 502) may determine the current operating mode of the rewritable non-volatile memory module 406 as the first operating mode or the second operating mode by determining whether the sub-logical address-physical address mapping table 810a (hereinafter, also referred to as the first sub-logical address-physical address mapping table) having the mapping information of the logical address LBA(1) is used before according to the management table.

Since the management table currently stores with the usage history of the sub-logical address-physical address mapping table 810a and the sub-logical address-physical address mapping table 810a is identical to the sub-logical address-physical address mapping table 810a corresponding to the logical address LBA(1), the memory control circuit unit 404 (or the memory management circuit 502) may determine the current operating mode of the rewritable non-volatile memory module 406 as the second operating mode. When the operating mode corresponding to the rewritable non-volatile memory module 406 is the second operating mode, the memory control circuit unit 404 (or the memory management circuit 502) may load the logical address-physical address mapping table 810 corresponding to the first command from the rewritable non-volatile memory module 406 into the first mapping table temporary storage area 508a of the buffer memory 508. Particularly, the logical address-physical address mapping table 810 includes, for example, the mapping information of the logical addresses LBA(0) to LBA(Z) (i.e., the logical zone LZ(0)). In other words, the logical address-physical address mapping table 810 includes the mapping information of the sub-logical address-physical address mapping table 810a, and the sub-logical address-physical address mapping table 810a is a subset of the logical address-physical address mapping table 810. It should be noted that, in an exemplary embodiment, the size of the logical address-physical address mapping table 810 may be 16 KBytes or other sizes, and the present invention is not intended to limit the size of the logical address-physical address mapping table 810.

Then, the memory control circuit unit 404 (or the memory management circuit 502) may use the logical address-physical address mapping table 810 being loaded into the buffer memory 508 to read the data from the physical programming units mapped to the logical address LBA(1). Specifically, since the first command is configured to read the data in the logical address LBA(1), the memory control circuit unit 404 (or the memory management circuit 502) may determine that the logical address LBA(1) is mapped to the physical erasing unit 410(1) according to the logical address-physical address mapping table 810. Then, the memory control circuit unit 404 (or the memory management circuit 502) may read the data in the corresponding physical programming units in the physical erasing unit 410(1) according to the first command.

Based on the above, in the second exemplary embodiment, the memory control circuit unit 404 (or the memory management circuit 502) may determine that the sub-logical address-physical address mapping table 810a including the mapping information of the logical address LBA(1) is used before by the memory control circuit unit 404 (or the memory management circuit 502). Accordingly, the memory control circuit unit 404 (or the memory management circuit 502) may reasonably determine that the mapping information in the logical address-physical address mapping table 810 corresponding to the sub-logical address-physical address mapping table 810a may likely be used again later. Therefore, the second operating mode is used to load the logical address-physical address mapping table 810 with larger capacity, so as to facilitate access of the mapping information in the logical address-physical address mapping table 810.

Third Exemplary Embodiment

Figure 11A:
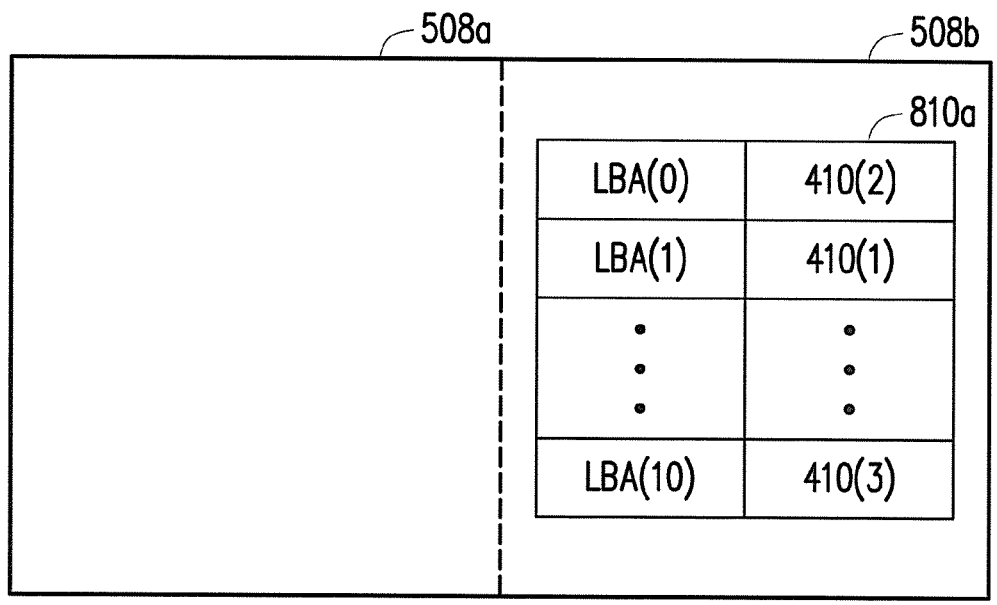
FIG. 11A and FIG. 11B are schematic diagrams illustrating a memory reading method according to a third exemplary embodiment.
Figure 11B:
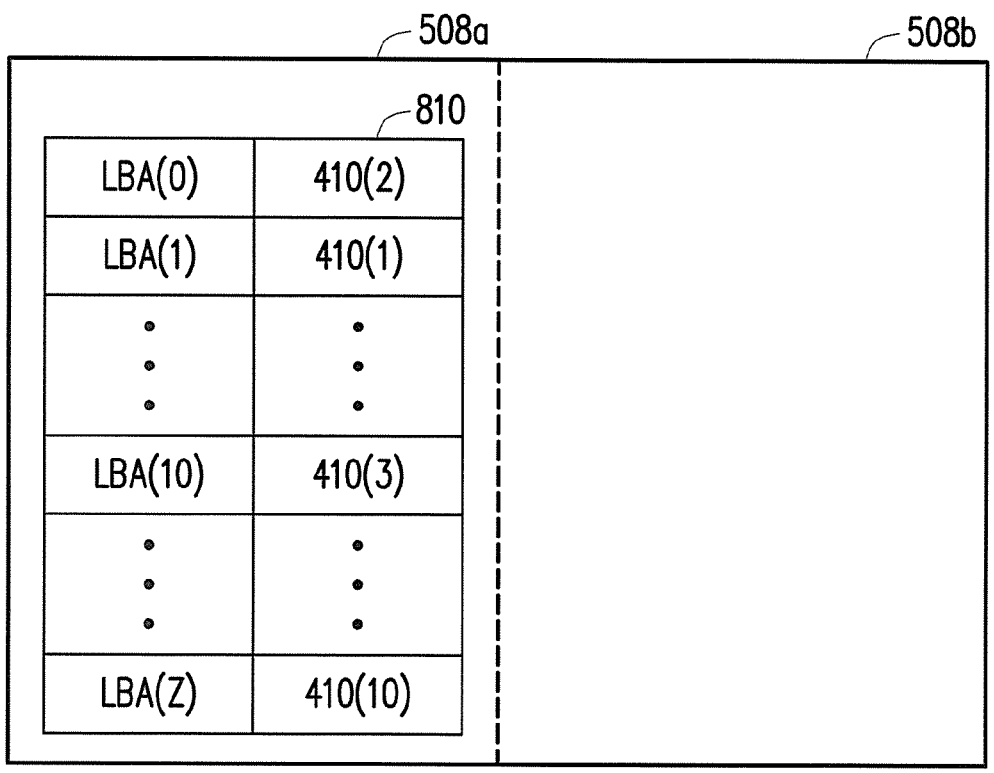

FIG. 11A and FIG. 11B are schematic diagrams illustrating a memory reading method according to a third exemplary embodiment. The exemplary embodiment of FIG. 11A includes similar process of loading the sub-logical address-physical address mapping table 810a according to the second command and recording the usage history of the sub-logical address-physical address mapping table 810a in the management table in FIG. 9A, which is not repeated hereinafter. Referring to FIG. 11B in continuation to FIG. 11A, it is assumed that the host system 11 then issues the first command that corresponds to data stored in the logical address LBA(Z) (hereinafter, also referred to as the first logical address), and the first command is a read command which instructs reading the data stored in the logical address LBA(Z). After the memory control circuit unit 404 (or the memory management circuit 502) receives the first command from the host system 11, the memory control circuit unit 404 (or the memory management circuit 502) may determine the current operating mode of the rewritable non-volatile memory module 406 as the first operating mode or the second operating mode. The memory control circuit unit 404 (or the memory management circuit 502) may determine the current operating mode of the rewritable non-volatile memory module 406 as the first operating mode or the second operating mode by determining whether the sub-logical address-physical address mapping table 810n (hereinafter, also referred to as the first sub-logical address-physical address mapping table) having the mapping information of the logical address LBA(Z) is used before according to the management table.

Since the management table currently only stores with the usage history of the sub-logical address-physical address mapping table 810a and the sub-logical address-physical address mapping table 810a is different from the sub-logical address-physical address mapping table 810n corresponding to the logical address LBA(Z), the memory control circuit unit 404 (or the memory management circuit 502) may determine the current operating mode of the rewritable non-volatile memory module 406 as the first operating mode. However, it should be noted that, at the time, the memory control circuit unit 404 (or the memory management circuit 502) also determines whether the logical address-physical address mapping table 810 (hereinafter, also referred to as the first logical address-physical address mapping table) of the logical zone LZ(0) corresponding to the sub-logical address-physical address mapping table 810a includes the sub-logical address-physical address mapping table 810n corresponding to the logical address (Z). If so, the memory control circuit unit 404 (or the memory management circuit 502) determines the current operating mode of the rewritable non-volatile memory module 406 as the second operating mode instead.

When the operating mode corresponding to the rewritable non-volatile memory module 406 is the second operating mode, the memory control circuit unit 404 (or the memory management circuit 502) loads the logical address-physical address mapping table 810 corresponding to the first command from the rewritable non-volatile memory module 406 into the first mapping table temporary storage area 508a of the buffer memory 508. Particularly, the logical address-physical address mapping table 810 includes, for example, the mapping information of the logical addresses LBA(0) to LBA(Z) (i.e., the logical zone LZ(0)). In other words, the logical address-physical address mapping table 810 includes the mapping information of the sub-logical address-physical address mapping table 810n, and the sub-logical address-physical address mapping table 810n is a subset of the logical address-physical address mapping table 810. It should be noted that, in an exemplary embodiment of the invention, the size of the logical address-physical address mapping table 810 may be 16 KBytes or other sizes, and the present invention is not intended to limit the size of the logical address-physical address mapping table 810.

Based on the above, in the third exemplary embodiment, the memory control circuit unit 404 (or the memory management circuit 502) may determine that the logical address LBA(Z) corresponding to the first command and the logical addresses LBA(0) to LBA(10) corresponding to the sub-logical address-physical address mapping table 810a belong to the same logical zone LZ(0). Accordingly, the memory control circuit unit 404 (or the memory management circuit 502) may reasonably determine that the mapping information in the logical address-physical address mapping table 810 corresponding to the logical zone LZ(0) may likely be used again later. Therefore, the second operating mode is used to load the logical address-physical address mapping table 810 with larger capacity, so as to facilitate access of the mapping information in the logical address-physical address mapping table 810.

Fourth Exemplary Embodiment

FIG. 12A and FIG. 12B are schematic diagrams illustrating a memory reading method according to a fourth exemplary embodiment. Referring to FIG. 12A, it is assumed that the memory control circuit unit 404 (or the memory management circuit 502) loads the logical address-physical address mapping table 810 (hereafter, referred to as a second logical address-physical address mapping table) from the rewritable non-volatile memory module 406 into the first mapping table temporary storage area 508a of the buffer memory 508, and the memory control circuit unit 404 (or the memory management circuit 502) then executes a third command according to the logical address-physical address mapping table 810. For example, the third command instructs reading data in the logical address LBA(0).

Next, referring to FIG. 12B in continuation to FIG. 12A, it is assumed that the host system 10 then issues the first command that corresponds to data stored in the logical address LBA(Z+11) (hereinafter, also referred to as the first logical address), and the first command is a read command which instructs reading the data stored in the logical address LBA(Z+11). After the memory control circuit unit 404 (or the memory management circuit 502) receives the first command from the host system 11, the memory control circuit unit 404 (or the memory management circuit 502) may determine the current operating mode of the rewritable non-volatile memory module 406 as the first operating mode or the second operating mode. In the present exemplary embodiment, the memory control circuit unit 404 (or the memory management circuit 502) may determine whether the logical address-physical address mapping table 820 including the logical address LBA(Z+11) corresponding to the third command is stored in the first mapping table temporary storage area 508a of the buffer memory 508.

At this time, the memory control circuit unit 404 (or the memory management circuit 502) may determine that the first mapping table temporary storage area 508a of the buffer memory 508 currently only stores with the logical address-physical address mapping table 810, and the logical address-physical address mapping table 810 is different from the logical address-physical address mapping table 820 including the logical address LBA(Z+11) corresponding to the third command. In this case, the memory control circuit unit 404 (or the memory management circuit 502) may determine the current operating mode of the rewritable non-volatile memory module 406 as the first operating mode, and load the sub-logical address-physical address mapping table 820a including the logical address LBA(Z+11) corresponding to the third command.

Particularly, it is assumed the host system 11 then issues a fourth command thereafter. If the mapping information of the fourth command may be found in the logical address-physical address mapping table 810 in the buffer memory 508, the memory control circuit unit 404 (or the memory management circuit 502) does not need to determine whether the current operating mode of the rewritable non-volatile memory module 406 is the first operating mode or the second operating mode. Rather, the memory control circuit unit 404 (or the memory management circuit 502) may directly execute the fourth command according to the logical address-physical address mapping table 810 in the buffer memory 508.

Based on the above, in the fourth exemplary embodiment, when one specific command is executed, the memory control circuit unit 404 (or the memory management circuit 502) may also determine whether the current operating mode of the rewritable non-volatile memory module 406 is the first operating mode by determining whether the buffer memory 508 stores with the logical address-physical address mapping table corresponding to the specific command, so as to determine whether to load the corresponding sub-logical address-physical address mapping table into the buffer memory 508.

It should be noted that, the first operating mode includes, for example, a random read operating mode, a random write operating mode or a garbage collection operating mode. The random read operating mode means that the host system 11 is consecutively issuing a plurality of read commands to perform a plurality of read operations respectively on the rewritable non-volatile memory module 406, wherein the required mapping information corresponding to each of the read operations are distributively stored in a plurality of different logical address-physical address mapping tables. For example, the memory control circuit unit 404 (or the memory management circuit 502) may determine that the mapping information of the logical addresses are distributively stored in the different logical address-physical address mapping tables according to the logical addresses respectively corresponding to the read operations, so as to further determine the current operating mode of the rewritable non-volatile memory module 406 as the random read operating mode. At the time, in order to avoid waste of bandwidth caused by repeatedly loading the logical address-physical address mapping table in larger size into the buffer memory 508, the memory control circuit unit 404 (or the memory management circuit 502) may load the sub-logical address-physical address mapping table in smaller size into the buffer memory 508 for reading in the random read operating mode.

The random write operating mode means that the host system 11 is issuing a plurality of write commands to perform a plurality of write operations respectively on the rewritable non-volatile memory module 406, wherein the required mapping information corresponding to each of the write operations are distributively stored in a plurality of different logical address-physical address mapping tables. For example, the memory control circuit unit 404 (or the memory management circuit 502) may determine that the mapping information of the logical addresses are distributively stored in the different logical address-physical address mapping tables according to the logical addresses respectively corresponding to the write operations, so as to further determine the current operating mode of the rewritable non-volatile memory module 406 as the random write operating mode. At the time, in order to avoid waste of bandwidth caused by repeatedly loading the logical address-physical address mapping table in larger size into the buffer memory 508, the memory control circuit unit 404 (or the memory management circuit 502) may load the sub-logical address-physical address mapping table in smaller size into the buffer memory 508 in the random write operating mode.

An operating mode for selecting recycle blocks in the garbage collection procedure means the memory control circuit unit 404 (or the memory management circuit 502) is performing the valid data merging procedure, and more particularly, a process of loading the mapping information of the recycle blocks having the valid data in the valid data merging procedure. Specifically, in the valid data merging procedure, moving the valid data requires loading and updating the mapping information of each valid data, and it is also possible that the mapping information are stored in a plurality of different logical address-physical address mapping tables, respectively. Therefore, when the memory control circuit unit 404 (or the memory management circuit 502) loads the mapping information of the valid data, the memory control circuit unit 404 (or the memory management circuit 502) may determine that the mapping information of the valid data are distributively stored in the different logical address-physical address mapping tables, so as to further determine the current operating mode of the rewritable non-volatile memory module 406 as the operating mode for selecting the recycle blocks in the garbage collection procedure. In order to avoid waste of bandwidth caused by repeatedly loading the logical address-physical address mapping table in larger size into the buffer memory 508, the memory control circuit unit 404 (or the memory management circuit 502) may load the sub-logical address-physical address mapping table in smaller size into the buffer memory 508 in the operating mode for selecting the recycle blocks in the garbage collection procedure.

Furthermore, the second operating mode includes, for example, a sequential read operating mode, a sequential write operating mode, an operating mode for writing target blocks in a garbage collection procedure or a flush operating mode.

The sequential read operating mode means that the host system 11 is issuing a plurality of read commands to perform a plurality of read operations on the rewritable non-volatile memory module 406, wherein the mapping information required by the read operations are sequentially stored in the same logical address-physical address mapping table. For example, the memory control circuit unit 404 (or the memory management circuit 502) may determine that the mapping information of the logical addresses are sequentially stored in the same logical address-physical address mapping table according to the logical addresses respectively corresponding to the read operations, so as to further determine the current operating mode of the rewritable non-volatile memory module 406 as the sequential read operating mode. In this case, the memory control circuit unit 404 (or the memory management circuit 502) can load the logical address-physical address mapping table in larger size into the buffering memory 508 for reading in the sequential read operating mode.

The sequential write operating mode means that the host system 11 is issuing a plurality of write commands to perform a plurality of write operations on the rewritable non-volatile memory module 406, wherein the mapping information required by the write operations are sequentially stored in the same logical address-physical address mapping table. For example, the memory control circuit unit 404 (or the memory management circuit 502) may determine that the mapping information of the logical addresses are sequentially stored in the same logical address-physical address mapping table according to the logical addresses respectively corresponding to the write operations, so as to further determine the current operating mode of the rewritable non-volatile memory module 406 as the sequential write operating mode. In this case, the memory control circuit unit 404 (or the memory management circuit 502) may load the logical address-physical address mapping table in larger size into the buffering memory 508 for reading in the sequential write operating mode.

The operating mode for writing the target blocks in the garbage collection procedure means that the memory control circuit unit 404 (or the memory management circuit 502) is writing the collected valid data into the target blocks. The operation of writing the collected valid data into the target blocks is similar to the sequential write operation being performed on the target block. In the garbage collection procedure, it is possible that the mapping information of a plurality of valid data are sequentially stored in one logical address-physical address mapping table. Therefore, the memory control circuit unit 404 (or the memory management circuit 502) may determine that the mapping information of the logical addresses are sequentially stored in the same logical address-physical address mapping table according to, for example, the logical addresses respectively corresponding to the write operations performed on the target blocks, so as to further determine that the current operating mode of the rewritable non-volatile memory module 406 as the operating mode for writing the target blocks in the garbage collection procedure. In this case, the memory control circuit unit 404 (or the memory management circuit 502) may load the logical address-physical address mapping table in larger size into the buffering memory 508 for reading in the operating mode for writing the target blocks in the garbage collection procedure.

The flush operating mode means that the memory control circuit unit 404 (or the memory management circuit 502) is writing a plurality of temporarily stored data in the buffer memory 508 into the rewritable non-volatile memory module 406. While performing a flush operation, the memory control circuit unit 404 (or the memory management circuit 502) may need to load the logical address-physical address mapping table in order to update the mapping information in the same logical address-physical address mapping table. Therefore, when the memory control circuit unit 404 (or the memory management circuit 502) is performing the flush operation, the memory control circuit unit 404 (or the memory management circuit 502) may determine the current operating mode of the rewritable non-volatile memory module 406 as the flush operating mode. In this case, the memory control circuit unit 404 (or the memory management circuit 502) may load the logical address-physical address mapping table in larger size into the buffering memory 508 for reading in the flush operating mode.

Based on the above, in the exemplary embodiments, the memory control circuit unit 404 (or the memory management circuit 502) loads the sub-logical address-physical address mapping table with smaller capacity into the buffer memory 508 in the first operating mode, and loads the logical address-physical address mapping table with larger capacity into the buffer memory 508 in the second operating mode. As a result, the performance deterioration of the memory storage apparatus caused by the repeatedly loading too many logical address-physical address mapping tables with larger capacity in the first operating mode may be effectively prevented.

Figure 13:
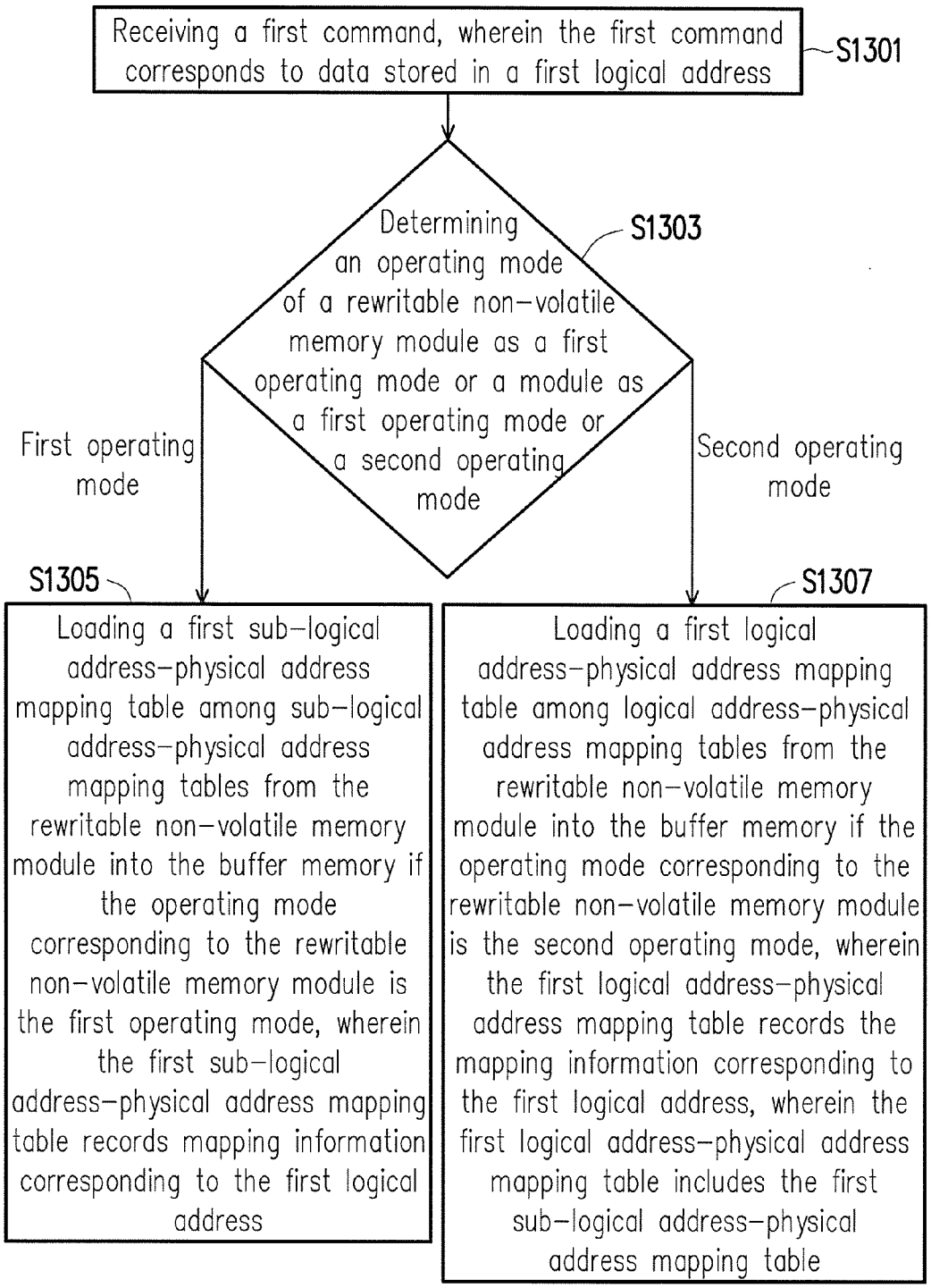
FIG. 13 is a flowchart illustrating a mapping table loading method according to an exemplary embodiment.

FIG. 13 is a flowchart illustrating a mapping table loading method according to an exemplary embodiment.

Referring to FIG. 13, in step S1301, the memory control circuit unit 404 (or the memory management circuit 502) receives a first command from the host system 11, wherein the first command corresponds to data stored in a first logical address. In step S1303, the memory control circuit unit 404 (or the memory management circuit 502) determines an operating mode of the rewritable non-volatile memory module 406 as a first operating mode or a second operating mode. If the operating mode corresponding to the rewritable non-volatile memory module 406 is the first operating mode, in step S1305, the memory control circuit unit 404 (or the memory management circuit 502) loads a first sub-logical address-physical address mapping table among sub-logical address-physical address mapping tables from the rewritable non-volatile memory module 406 into the buffer memory 508, wherein the first sub-logical address-physical address mapping table records mapping information corresponding to the first logical address. If the operating mode corresponding to the rewritable non-volatile memory module 406 is the second operating mode, in step S1307, the memory control circuit unit 404 (or the memory management circuit 502) loads a first logical address-physical address mapping table among logical address-physical address mapping tables from the rewritable non-volatile memory module 406 into the buffer memory 508, wherein the first logical address-physical address mapping table records the mapping information corresponding to the first logical address, wherein the first logical address-physical address mapping table includes the first sub-logical address-physical address mapping table.

In summary, according to the present invention, the sub-logical address-physical address mapping table with smaller capacity is loaded into the buffer memory in the first operating mode, and the logical address-physical address mapping table with larger capacity is loaded into the buffer memory in the second operating mode. In particular, because only the sub-logical address-physical address mapping table with smaller capacity is loaded in the first operating mode, waste of bandwidth in the memory storage apparatus caused by repeatedly loading the logical address-physical address mapping table with larger capacity by the host system in the first operating mode may be prevented and the usage efficiency and performance of the memory storage apparatus may also be improved accordingly.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mapping table loading method for a rewritable non-volatile memory module, wherein the rewritable non-volatile memory module stores a plurality of logical address-physical address mapping tables, and each of the logical address-physical address mapping tables has a plurality of sub-logical address-physical address mapping tables, the mapping table loading method comprising:
   receiving a first command, wherein the first command corresponds to data stored in a first logical address;
   loading a first sub-logical address-physical address mapping table among the sub-logical address-physical address mapping tables from the rewritable non-volatile memory module into a buffer memory if an operating mode corresponding to the rewritable non-volatile memory module is a first operating mode, wherein the first sub-logical address-physical address mapping table records mapping information corresponding to the first logical address; and
   loading a first logical address-physical address mapping table among the logical address-physical address mapping tables from the rewritable non-volatile memory module into the buffer memory if the operating mode corresponding to the rewritable non-volatile memory module is a second operating mode, wherein the first logical address-physical address mapping table records the mapping information corresponding to the first logical address,
   wherein the first logical address-physical address mapping table includes the first sub-logical address-physical address mapping table.

2. The mapping table loading method of claim 1, wherein before the step of receiving the first command, the mapping table loading method further comprises:
   executing a second command according to a second sub-logical address-physical address mapping table;
   determining the operating mode of the rewritable non-volatile memory module as the first operating mode if the second sub-logical address-physical address mapping table is different from the first sub-logical address-physical address mapping table; and
   determining the operating mode of the rewritable non-volatile memory module as the second operating mode if the second sub-logical address-physical address mapping table is identical to the first sub-logical address-physical address mapping table.

3. The mapping table loading method of claim 2, wherein when the second sub-logical address-physical address mapping table is different from the first sub-logical address-physical address mapping table, the mapping table loading method further comprises:
   determining the operating mode of the rewritable non-volatile memory module as the second operating mode if the first logical address-physical address mapping table includes the second sub-logical address-physical address mapping table.

4. The mapping table loading method of claim 1, wherein before the step of receiving the first command, the mapping table loading method further comprises:
   executing a third command according to a second logical address-physical address mapping table; and
   determining the operating mode of the rewritable non-volatile memory module as the first operating mode if the second logical address-physical address mapping table is different from the first logical address-physical address mapping table.

5. The mapping table loading method of claim 1, wherein when the operating mode of the rewritable non-volatile memory module is the first operating mode, the mapping table loading method further comprises:
   executing the first command according to the first sub-logical address-physical address mapping table;
   erasing the first sub-logical address-physical address mapping table; and
   recording a usage history of the first sub-logical address-physical address mapping table into a management table.

6. The mapping table loading method of claim 1, wherein the operating mode of the rewritable non-volatile memory module is preset as the first operating mode each time after power-on.

7. The mapping table loading method of claim 1, wherein the first operating mode comprises a random read operating mode, a random write operating mode or an operating mode for selecting recycle blocks in a garbage collection procedure.

8. The mapping table loading method of claim 1, wherein the second operating mode comprises a sequential read operating mode, a sequential write operating mode, an operating mode for writing target blocks in a garbage collection procedure or a flush operating mode.

9. A memory control circuit unit for controlling a rewritable non-volatile memory module, the memory control circuit unit comprising:
   a host interface configured to couple to a host system;
   a memory interface configured to couple to the rewritable non-volatile memory module, wherein the rewritable non-volatile memory module stores a plurality of logical address-physical address mapping tables, and each of the logical address-physical address mapping tables has a plurality of sub-logical address-physical address mapping tables;
   a buffer memory; and
   a memory management circuit coupled to the host interface, the memory interface and the buffer memory,
   the memory management circuit is configured to receive a first command, wherein the first command corresponds to data stored in a first logical address;
   the memory management circuit is further configured to load a first sub-logical address-physical address mapping table among the sub-logical address-physical address mapping tables from the rewritable non-volatile memory module into the buffer memory if an operating mode corresponding to the rewritable non-volatile memory module is a first operating mode, wherein the first sub-logical address-physical address mapping table records mapping information corresponding to the first logical address,
   the memory management circuit is further configured to load a first logical address-physical address mapping table among the logical address-physical address mapping tables from the rewritable non-volatile memory module into the buffer memory if the operating mode corresponding to the rewritable non-volatile memory module is a second operating mode, wherein the first logical address-physical address mapping table records the mapping information corresponding to the first logical address,
   wherein the first logical address-physical address mapping table includes the first sub-logical address-physical address mapping table.

10. The memory control circuit unit of claim 9, wherein before the operation of receiving the first command, the memory management circuit is further configured to execute a second command according to a second sub-logical address-physical address mapping table, the memory management circuit is further configured to determine the operating mode of the rewritable non-volatile memory module as the first operating mode if the second sub-logical address-physical address mapping table is different from the first sub-logical address-physical address mapping table, and the memory management circuit is further configured to determine the operating mode of the rewritable non-volatile memory module as the second operating mode if the second sub-logical address-physical address mapping table is identical to the first sub-logical address-physical address mapping table.

11. The memory control circuit unit of claim 10, wherein when the second sub-logical address-physical address mapping table is different from the first sub-logical address-physical address mapping table, the memory management circuit is further configured to determine the operating mode of the rewritable non-volatile memory module as the second operating mode if the first logical address-physical address mapping table includes the second sub-logical address-physical address mapping table.

12. The memory control circuit unit of claim 9, wherein before the operation of receiving the first command, the memory management circuit is further configured to execute a third command according to a second logical address-physical address mapping table, and the memory management circuit is further configured to determine the operating mode of the rewritable non-volatile memory module as the first operating mode if the second logical address-physical address mapping table is different from the first logical address-physical address mapping table.

13. The memory control circuit unit of claim 9, wherein when the operating mode of the rewritable non-volatile memory module is the first operating mode, the memory management circuit is further configured to execute the first command according to the first sub-logical address-physical address mapping table, the memory management circuit is further configured to erase the first sub-logical address-physical address mapping table, and the memory management circuit is further configured to record a usage history of the first sub-logical address-physical address mapping table into a management table.

14. The memory control circuit unit of claim 9, wherein the operating mode of the rewritable non-volatile memory module is preset as the first operating mode each time after power-on.

15. The memory control circuit unit of claim 9, wherein the first operating mode comprises a random read operating mode, a random write operating mode or an operating mode for selecting recycle blocks in a garbage collection procedure.

16. The memory control circuit unit of claim 9, wherein the second operating mode comprises a sequential read operating mode, a sequential write operating mode, an operating mode for writing target blocks in a garbage collection procedure or a flush operating mode.

17. A memory storage apparatus, comprising:
a connection interface unit configured to couple to a host system;

a rewritable non-volatile memory module configured to store a plurality of logical address-physical address mapping tables, wherein each of the logical address-physical address mapping tables has a plurality of sub-logical address-physical address mapping tables; and a memory control circuit unit comprising a buffer memory, wherein the memory control circuit unit is coupled to the connection interface unit and the rewritable non-volatile memory module, wherein the memory control circuit unit is configured to receive a first command, wherein the first command corresponds to data stored in a first logical address;

the memory control circuit unit is further configured to load a first sub-logical address-physical address mapping table among the sub-logical address-physical address mapping tables from the rewritable non-volatile memory module into the buffer memory if an operating mode corresponding to the rewritable non-volatile memory module is a first operating mode, wherein the first sub-logical address-physical address mapping table records mapping information corresponding to the first logical address, the memory control circuit unit is further configured to load a first logical address-physical address mapping table among the logical address-physical address mapping tables from the rewritable non-volatile memory module into the buffer memory if the operating mode corresponding to the rewritable non-volatile memory module is a second operating mode, wherein the first logical address-physical address mapping table records the mapping information corresponding to the first logical address, wherein the first logical address-physical address mapping table includes the first sub-logical address-physical address mapping table.

18. The memory storage apparatus of claim 17, wherein before the operation of receiving the first command, the memory control circuit unit is further configured to execute a second command according to a second sub-logical address-physical address mapping table, the memory control circuit unit is further configured to determine the operating mode of the rewritable non-volatile memory module as the first operating mode if the second sub-logical address-physical address mapping table is different from the first sub-logical address-physical address mapping table, and the memory control circuit unit is further configured to determine the operating mode of the rewritable non-volatile memory module as the second operating mode if the second sub-logical address-physical address mapping table is identical to the first sub-logical address-physical address mapping table.

19. The memory storage apparatus of claim 18, wherein when the second sub-logical address-physical address mapping table is different from the first sub-logical address-physical address mapping table, the memory control circuit unit is further configured to determine the operating mode of the rewritable non-volatile memory module as the second operating mode if the first logical address-physical address mapping table includes the second sub-logical address-physical address mapping table.

20. The memory storage apparatus of claim 17, wherein before the operation of receiving the first command, the memory control circuit unit is further configured to execute a third command according to a second logical address-physical address mapping table, the memory control circuit unit is further configured to determine the operating mode of the rewritable non-volatile memory module as the first operating mode if the second logical address-physical address mapping table is different from the first logical address-physical address mapping table.

21. The memory storage apparatus of claim 17, wherein when the operating mode of the rewritable non-volatile memory module is the first operating mode, the memory control circuit unit is further configured to execute the first command according to the first sub-logical address-physical address mapping table, the memory control circuit unit is further configured to erase the first sub-logical address-physical address mapping table, and the memory control circuit unit is further configured to record a usage history of the first sub-logical address-physical address mapping table into a management table.

22. The memory storage apparatus of claim 17, wherein the operating mode of the rewritable non-volatile memory module is preset as the first operating mode each time after power-on.

23. The memory storage apparatus of claim 17, wherein the first operating mode comprises a random read operating mode, a random write operating mode or an operating mode for selecting recycle blocks in a garbage collection procedure.

24. The memory storage apparatus of claim 17, wherein the second operating mode comprises a sequential read operating mode, a sequential write operating mode, an operating mode for writing target blocks in a garbage collection procedure or a flush operating mode.

* * * * *